United States Patent [19]

Wegner et al.

[11] Patent Number: 4,536,262

[45] Date of Patent: Aug. 20, 1985

[54] PREPARATION OF POLY(HETEROAROMATICS), AND FILMS OBTAINED BY THIS METHOD

[75] Inventors: Gerhard Wegner, Denzlingen; Wolfgang Wernet, Freiburg, both of Fed. Rep. of Germany

[73] Assignee: BASF Aktiengesellschaft, Fed. Rep. of Germany

[21] Appl. No.: 613,348

[22] Filed: May 23, 1984

[51] Int. Cl.³ ................................................. C25B 3/02
[52] U.S. Cl. .................................... 204/56 R; 204/78
[58] Field of Search ............... 204/78, 72, 59 R, 56 R

[56] References Cited

U.S. PATENT DOCUMENTS

| 3,574,072 | 4/1971 | Louvar ................................. 204/72 |
| 4,401,545 | 8/1983 | Naarmann et al. ................ 204/291 |
| 4,468,291 | 8/1984 | Naarmann et al. .................. 204/78 |

*Primary Examiner*—R. L. Andrews
*Attorney, Agent, or Firm*—Keil & Weinkauf

[57] ABSTRACT

Poly(heteroaromatics) are prepared by electrochemical polymerization, in particular anodic oxidation, of a monomeric heteroaromatic compound in an aqueous electrolyte solvent in which the monomeric heteroaromatic compound is dispersed, in the presence of a conductive salt and a dispersant. The films obtained by the process have good mechanical properties and high electrical conductivities.

6 Claims, No Drawings

PREPARATION OF POLY(HETEROAROMATICS), AND FILMS OBTAINED BY THIS METHOD

The present invention relates to a process for the preparation of poly(heteroaromatics) by electrochemical polymerization, in particular anodic oxidation, of a heteroaromatic compound in an aqueous electrolyte solvent in the presence of a conductive salt, with deposition of the poly(heteroaromatics) on the surface of the anode, which is preferably a sheet-like structure.

One of the reasons why poly(heteroaromatics), eg. polypyrrole, have recently become particularly important is that they can be readily converted to highly electrically conductive systems having metallic conductivity by doping with electron acceptors. Where they are to be used in the electrical industry for semiconductor components, switches, screening materials or solar cells, it is frequently advantageous if the poly(heteroaromatics) can be obtained and used in the form of films.

It is known that pyrrole polymer films can be prepared by anodic oxidation of pyrrole or a substituted pyrrole in a polar organic electrolyte solvent in the presence of a conductive salt. The resulting polypyrrole films have an electrical conductivity as high as about $10^2$ ohm$^{-1}$cm$^{-1}$ (cf. for example J. Chem. Soc. Chem. Comm. 1979, page 635; ibid., page 854; or DE-A-No. 3,049,551). The disadvantage of this process is that organic solvents, eg. acetonitrile, are used, although it is stated that small amounts of water, eg. as much as 3% by weight, can be added to the electrolyte solvent to increase the electrical conductivity.

The electrochemical polymerization of 5-membered and 6-membered heterocyclic compounds is also described in U.S. Pat. No. 3,574,072. The electrolysis takes place in an organic solvent and an alkaline medium, in particular an aqueous alkaline medium. According to the examples of the stated patent, the amount of water in the electrolyte solvent is not more than 25% by weight, based on the electrolyte solvent. Attempts to replace some or all of the organic electrolyte solvent by water resulted in low-quality products. In particular, it was impossible to obtain satisfactory, cohesive polymer films.

It is an object of the present invention to provide a process for the preparation of poly(heteroaromatics) which is simple to carry out, does not require the use of organic solvents and can take place in particular in water or an aqueous system, and permits films having the desired, predetermined properties, eg. size, thickness, mechanical properties, etc., to be prepared in a selective and reproducible manner and under a very wide range of process conditions. The resulting poly(heteroaromatics) should also possess good electrical conductivity and/or be easy to convert to highly electrically conductive products.

We have found, surprisingly, that this object is achieved by a process in which a heteroaromatic compound dispersed in an aqueous electrolyte solvent is polymerized by electrochemical oxidation, with the addition of a dispersant and in the presence or absence of an additional conductive salt.

The present invention accordingly relates to a process for the preparation of poly(heteroaromatics), particularly in the form of films, by electrochemical polymerization, in particular anodic oxidation, of a heteroaromatic compound in a water-containing electrolyte solvent in the presence of a conductive salt, with deposition of the poly(heteroaromatics) on the surface of the anode, wherein the said polymerization is carried out in an aqueous electrolyte solvent in which the monomeric heteroaromatic compound is dispersed, a dispersant being added.

In view of the fact that the electrochemical polymerization of heteroaromatics in a predominantly or exclusively aqueous system in the presence of a conventional conductive salt gave only gritty polymers or at best low-quality films having unsatisfactory mechanical strength, it was extremely surprising that when a dispersant, in particular an emulsifier, is added to the aqueous electrolyte solvent strong cohesive films of good quality can be obtained. The dispersants or emulsifiers hold the monomers together in small droplets and micelles, and the polymerization usually takes place in these droplets, so that a skilled worker would expect the addition of a dispersant to be more likely to promote the formation of particulate polymers, in particular powder polymers, rather than film formation. According to the invention, the poly(heteroaromatic) films can be prepared in a simple and reproducible manner and in any desired size and thickness, and, when sufficiently thick, can generally be peeled off without difficulty from the surface of the sheet-like anode. As a rule, the process according to the invention leads directly to electrically conductive poly(heteroaromatic) films, with electrical conductivities of generally above $10^{-2}$, preferably above 1, ohm$^{-1}$cm$^{-1}$.

For the purposes of the present invention, poly(heteroaromatics) are polymers which contain repeating heteroaromatic structural units. In addition to these units, the poly(heteroaromatics) can also contain further comonomer units. The term poly(heteroaromatics) includes both high molecular weight and appropriate oligomeric products, provided that these are solids at room temperature and capable of forming films.

Monomers which are particularly advantageously used in the novel process are heteroaromatic compounds possessing 5-membered or 6-membered ring systems. They preferably contain 1, 2 or 3 heteroatoms, in particular N, O and/or S atoms, in the ring system and can be substituted at the ring carbon atoms, for example by alkyl, in particular of 1 to 6 carbon atoms, two or more ring carbon atoms preferably being unsubstituted in order to permit the anodic oxidation to be carried out readily smoothly. Examples of such heteroaromatic compounds are furan, thiophene, thiazole, oxazole, thiadiazole, imidazole, pyridine, 3,5-dimethylpyridine, pyrazine and 3,5-dimethylpyrazine. Monomers which are very particularly advantageously used in the novel process are the pyrroles, in particular unsubstituted pyrrole itself, but also the substituted pyrroles, such as those which are monoalkyl-, dialkyl-, monohalogen- or dihalogen-substituted at the carbon atoms. Preferred substituted pyrroles are the 3,4-dialkylpyrroles, eg. 3,4-dimethylpyrrole and 3,4-diethylpyrrole and the 3,4-dihalopyrroles, in particular 3,4-dichloropyrrole.

The monomeric heteroaromatic compounds can be used alone, as a mixture with one another or together with other comonomers, and the weight ratio of the comonomers can vary within wide limits. Thus, by varying the monomers, a large variety of poly(heteroaromatic) films can be prepared in a simple manner. The preferred monomer is unsubstituted pyrrole, which may be used alone or as a mixture with other heteroaromatics from amongst those stated above.

According to the invention, the electrochemical polymerization of the heteroaromatic compounds is carried out in water or a mixture of water with a water-soluble organic solvent as the electrolyte solvent. Particularly suitable water-soluble organic solvents are alcohols, eg. methanol, ethanol or diethylene glycol, ethers, eg. tetrahydrofuran, ketones, eg. acetone, and acetonitrile, dimethylformamide, dimethyl sulfoxide, etc. If a mixture of water with another solvent is used as the electrolyte solvent, this solvent should contain not less than the minimum amount of water required to ensure that the monomeric heteroaromatic compounds are not dissolved in the electrolyte solvent but are present in dispersed form. In general, the electrolyte solvent contains not less than 50, preferably not less than 80, % by weight of water. Preferred electrolyte solvent systems contain more than 90% by weight of water, and water itself is particularly preferred. Depending on the other additives present, in particular the dispersants and the conductive salts, the pH of the aqueous electrolyte solvent in the novel process can be alkaline, neutral or acidic, and may be, for example, from 2 to 11. However, care should be taken to ensure that substances added to the electrolyte solvent do not cancel out or destroy the effect of the dispersant used according to the invention.

An essential feature of the novel process is that the electrochemical polymerization is carried out in the presence of a dispersant. Particularly suitable dispersants are the conventional emulsifiers, as employed in the usual emulsion polymerization. The dispersants or emulsifiers should remain soluble in the aqueous electrolyte solvent used, in particular in water itself, and should preferably also remain soluble under the conditions of the electrochemical polymerization. Emulsifiers which have proven particularly useful in the process according to the invention are the anionic and neutral emulsifiers. Examples of suitable and preferred emulsifiers are the alkali metal salts, preferably the sodium or potassium salts of alkylsulfonic acids (in particular where alkyl is of 12 to 18 carbon atoms), of alkylarylsulfonic acids (in particular of 10 to 30 carbon atoms), of alkylsulfuric acids (in particular where alkyl is of 12 to 18 carbon atoms), of fatty alcohol sulfonic acids (in particular where the fatty alcohol is of 10 to 30, preferably 12 to 18, carbon atoms) or of $C_{10}$–$C_{30}$ fatty acids (in particular those having a chain length of from 12 to 18 carbon atoms). The sodium and potassium salts of the stated sulfonic and sulfuric acids are particularly advantageous. Another group of very useful emulsifiers includes the esters of polyalcohols and the alkyl- and alkylarylpoly(ethylene oxide) condensates, for example the monoethers of polyethylene oxide and long-chain alcohols, in particular fatty alcohols of 12 to 18 carbon atoms, the esters of fatty acids and polyethylene oxide, and the block copolymers of propylene oxide and ethylene oxide, or the polyethylene glycols themselves. Polymers containing anionic groups, for example polyacrylic acid and its salts, or polystyrenesulfonic acid and its salts, have also proven very advantageous dispersants for the process according to the invention. This makes it possible to achieve even greater variation in the properties of the poly(heteroaromatics). Instead of the addition of a single emulsifier, it has frequently proven advantageous to use a combination of different emulsifiers, for example of anionic and neutral emulsifiers.

To obtain the pH which is most advantageous for the particular emulsifier used, a small amount of an acid, a base or a conventional buffer system can, if required, be added to the electrolyte solvent. In a typical embodiment of the novel process, the amount of dispersant or emulsifier used is from 0.01 to 0.1 mole per liter of electrolyte solvent. However, the concentration of the dispersant or emulsifier can be much higher or much lower than the stated range, and is generally from 0.001 to 1 mole per liter of electrolyte solvent in the case of low molecular weight dispersants. The amount of dispersant used must in any case be sufficient to ensure that the monomers used are thoroughly dispersed in the electrolyte solvent; although it is advantageous to avoid too large an excess of dispersant, such an excess does not have an adverse effect when the novel process is carried out. In the process according to the invention, the monomer concentration is generally kept at from 0.001 to 5, preferably from 0.01 to 1, mole per liter of electrolyte solvent, but may be above or below this range.

In carrying out the process according to the invention, the electrolyte solvent also contains a conductive salt, which is required, in particular, to transport the current in the electrolyte solvent during the electrochemical polymerization. Suitable conductive salts are all ionic or ionizable compounds which are conventionally used for this purpose and which are soluble in the electrolyte solvent, in particular in water, provided that the deposition potential of their anion is not reached during the electrochemical polymerization, ie. the oxidation potential of the monomer or monomers is lower than the deposition potential of the anion of the conductive salt. In general, suitable conductive salts for the novel process include all ionic or ionizable compounds for which the deposition potential of the anion is above about 0.8–1 volt, measured with reference to a standard calomel electrode. In the process according to the invention, the concentration of the conductive salt is in general from 0.001 to 1, preferably from 0.01 to 0.5, mole per liter of electrolyte solvent.

Suitable cations for the conductive salts are the alkaline earth metal cations and $H^+$, and in particular the alkali metal cations, preferably $Li^+$, $Na^+$ or $K^+$. Other, very advantageous cations are $NO^+$ and $NO_2^+$, and in particular the onium cations, especially those of nitrogen and of phosphorus, for example those of the $R_4N^+$ and $R_4P^+$ type, where the radicals R independently of one another are each hydrogen, a lower alkyl radical, or a cycloaliphatic or aromatic radical. Preferred onium cations are the tertiary and quaternary ammonium and phosphonium cations, in particular those in which R is alkyl of 1 to 6 carbon atoms.

$BF_4^-$, $AsF_4^-$, $AsF_6^-$, $SbF_6^-$, $SbCl_6^-$, $PF_6^-$, $ClO_4^-$, $HSO_4^-$ and $SO_4^{2-}$ have proven particularly advantageous anions for the conductive salt. With the above preconditions, it is also possible to use conductive salts containing other anions, eg. $Cl^-$ or $F^-$. Another group of conductive salts is derived from aliphatic or aromatic carboxylic acids, for example formic acid, acetic acid, propionic acid, butyric acid, valeric acid, the higher fatty acids of 12 to 18 carbon atoms or unsubstituted or substituted benzoic acid, the fatty acid anions and the acetate and benzoate anions being singled out for the conductive salts. Other important conductive salts are the alkylsulfates and in particular and aliphatic and aromatic sulfonates. Representative of this group of conductive salts are those containing the $CF_3SO_3^-$ anion or an aromatic sulfonic acid anion, as well as the alkylsulfonates, alkylarylsulfonates or polystyrenesulfonates used as emulsifiers.

We have found that, in the process according to the invention, the ionic dispersants, in particular the anionic emulsifiers, can also be used as conductive salts. Accordingly, in a particular embodiment of the process, the electrochemical polymerization of the heteroaromatic compounds is carried out in an aqueous electrolyte solvent in the presence of an anionic dispersant, in the presence or absence of neutral, non-ionic emulsifiers, and without the addition of a further conductive salt. In this case, the alkylsulfates, the alkylsulfonates and the alkylarylsulfonates have proven particularly useful in their combined function as emulsifier and conductive salt.

A separate conductive salt has to be added to the electrolyte solution whenever the only dispersants present are neutral, non-ionic emulsifiers. It is of course also possible to use additional conductive salts when the dispersants employed are anionic emulsifiers or mixtures of anionic emulsifiers with neutral emulsifiers.

The novel process can be carried out in the conventional electrolysis cells or electrolysis apparatuses. Examples of very suitable apparatuses are simple electrolysis apparatuses consisting of a cell without a diaphragm and with two electrodes and an external current source. The electrodes can be made of, for example, graphite or a conventional inert electrode material, in particular a noble metal, such as platinum or palladium, stainless steel, nickel or titanium. In the electrochemical polymerization, the monomeric heteroaromatic compounds undergo anodic oxidation and the resulting polymers are deposited on the anode, so that, in order to prepare poly(heteroaromatic) films, the anode, but in particular both electrodes, are sheet-like structures. The size of the anode surface corresponds to the size of the resulting polymer film. Preferably, the surfaces of the two electrodes are arranged parallel to one another.

Apart from the abovementioned simple electrolysis cell without a diaphragm, it is also possible to use other electrolysis apparatuses for the novel process, for example cells with diaphragms or those containing reference electrodes for accurate determination of the potential. It is often advantageous to measure the amount of current (A sec), since this permits, inter alia, monitoring of the thickness of the deposited film.

The novel process is usually carried out at room temperature. However, since the temperature at which polymerization of the heteroaromatic compounds takes place has proven not to be critical, the temperature can be varied within a wide range, provided that it does not fall below the solidification temperature of the electrolyte solvent or exceed the boiling point of this solvent. In general, a polymerization temperature of from 0° to 50° C., in particular from +10° to +30° C., has proven very advantageous.

Any d.c. current source, eg. a battery which delivers a sufficiently high electrical voltage, is a suitable current source for operating the electrolysis cell in which the novel process is carried out. The electrochemical polymerization according to the invention is usually carried out using a voltage of from 1 to 10, preferably from 1.5 to 4, volt. The voltage chosen depends, inter alia, on the electrode spacing, the larger the spacing, the higher being the voltage chosen. An advantageous current density in the novel process is from 0.05 to 50, preferably from 0.1 to 5, mA/cm$^2$.

Factors on which the duration of the electrolysis depends include the electrolyte system used, the particular electrolysis conditions and in particular the film thickness desired. Usually, the electrolysis takes from a few hours to several hours. For example, films a few $\mu$m, eg. from 5 to 10 $\mu$m, thick, can readily be obtained in the course of one hour, so that films from 10 to 100 $\mu$m thick can be prepared in the course of, for example, from 2 to 12 hours.

The poly(heteroaromatic) film deposited on the anode during electrolysis is washed with a solvent, preferably water or an aqueous solvent, to remove adhering conductive salt and/or emulsifier, and is dried at from 25° to 150° C., preferably under reduced pressure. When the electrodes used are made of graphite, a noble metal, steel, titanium, nickel or the like, the poly(heteroaromatic) film can then in general be easily detached from the electrode, especially when a layer more than 20 $\mu$m thick has been deposited. The resulting films are self-supporting and stable and possess good mechanical properties and strengths and a well formed, cohesive surface.

The poly(heteroaromatic) films prepared according to the invention not only possess good mechanical properties but generally also simultaneously have a high electrical conductivity, which is generally above 10$^{-2}$, in particular above 1, ohm$^{-1}$cm$^{-1}$, measured by the two-point or four-point method. Some or all of the anion of the conductive salt used in the preparation of the electrically conductive poly(heteroaromatics) is incorporated into this poly(heteroaromatic), as a dopant. Surprisingly, we have found that highly electrically conductive polymer films are also obtained if the process according to the invention is carried out using anionic emulsifiers, without the addition of further conductive salts. In this case, the anionic emulsifiers, eg. the alkyl- or alkylarlsulfonates, act not only as dispersants but also as conductive salts and dopants for the resulting poly(heteroaromatics). In this case, too, electrical conductivities above 1 ohm$^{-1}$cm$^{-1}$ are achieved. If, in the novel process, other conductive salts are used in addition to or in place of the anionic emulsifiers, the tetrafluoborates, hexafluoroarsenates, hexafluoroantimonates, hexachloroantimonates, hexafluorophosphates, perchlorates, acetates and benzoates are preferred for the preparation of highly electrically conductive products. If the intention is further to increase or improve the electrical conductivity of the poly(heteroaromatics) prepared according to the invention, it is fully possible to treat these films, in a conventional manner, in the gas phase or in solution, with the conventional dopants, eg. AsF$_5$, SbF$_5$, SbCl$_5$, etc. However, such an additional chemical doping of the novel poly(heteroaromatics) to increase the electrical conductivity is generally unnecessary.

The poly(heteroaromatics) prepared according to the invention possess very good performance characteristics and can be used in any field in which the conventional poly-(heteroaromatics) are used. This includes, for example, their use for the production of catalysts, electrical switches, semiconductor components, electrodes and screening materials, and for the antistatic treatment of plastics.

The Examples which follow illustrates the invention. Parts and percentages are by weight, unless stated otherwise.

EXAMPLE 1

3 parts of sodium dodecylsulfate, 2 parts of sodium hexafluorophosphate, 2 parts of pyrrole and 100 parts of water are introduced into an electrolysis cell which is not flushed with air. The electrodes can be made either of platinum or of nickel. At an anode current density of 200 $\mu A/cm^2$ and a cell voltage of 2.2 V, an 80 $\mu$m thick polypyrrole film can be removed from the anode after electrolysis lasting 12 hours. The homogeneous film has a conductivity of 40 $(cm)^{-1}$.

EXAMPLE 2

11 parts of sodium dodecylsulfate, 2 parts of pyrrole and 100 parts of water are introduced into an electrolysis cell as described in Example 1. Under the same electrolysis conditions as in Example 1, a 70 $\mu$m thick homogeneous polypyrrole film having a conductivity of 35 $(\Omega cm)^{-1}$ can be removed from the anode after 12 hours.

EXAMPLE 3

10 parts of polyoxyethylene lauryl ether (® Brij 35), 1 part of sodium tetrafluoborate, 2 parts of pyrrole and 100 parts of water are electrolyzed for 12 hours under the same conditions as in Example 1. A 40 $\mu$m thick polypyrrole film having a conductivity of 10 $(\Omega cm)^{-1}$ is formed on the anode.

EXAMPLE 4

2 parts of sodium polystyrenesulfonate ($M_w$ 700,000), 2 parts of pyrrole and 100 parts of water are introduced into an electrolysis cell as described in Example 1. At an anode current density of 150 $\mu A/cm^2$, a 90 $\mu$m thick polypyrrole film having a conductivity of 8 $(\Omega cm)^{-1}$ is formed in the course of 12 hours.

EXAMPLE 5

5 parts of sodium dodecylsulfate and 1 part of 3,4-dichloropyrrole, dissolved in 10 parts of $CH_3CN$, are emulsified in 100 parts of water. In an electrolysis cell as described in Example 1, and at a current density of 400 $\mu A/cm^2$, a 40 $\mu$m thick polymer film consisting of 3,4-dichloropyrrole units is obtained after 12 hours. The conductivity of the film is 20 $(\Omega cm)^{-1}$.

EXAMPLE 6

3.1 parts of polyacrylic acid ($M_w$ 250,000), 100 parts of water and 2 parts of pyrrole are introduced into an electrolysis cell as described in Example 1. After 24 hours, a homogeneous film about 60 $\mu$m thick and with a conductivity of $10^{-1}$ $(\Omega cm)^{-1}$ is obtained.

In all of the examples, the resulting polymer films were removed mechanically from the anode, extracted with methanol for 12 hours and then dried under reduced pressure. The mechanical flexibility was excellent, and it was possible to bend 80 $\mu$m thick films to form a cylinder of 2 mm diameter, without fracture occurring.

We claim:

1. In an electrochemical process for preparing a poly(heteroaromatic) film wherein heteroaromatic compounds are polymerized by an anodic oxidation carried out in an electrolyte solvent in the presence of a conductive salt with the electrolyte solvent consisting essentially of a polar organic compound, and wherein the resulting polymer deposits in the form of a film on the surface of the anode, the improvement which comprises: dispersing said monomeric heteroaromatic compounds in an aqueous electrolyte solvent consisting of at least 80 percent by weight of water and to which has been added a water soluble dispersant selected from the group consisting of a neutral emulsifier, an anionic emulsifier or a mixture thereof together with the further addition of a conductive salt, with the proviso that a conductive salt need not be present when an anionic emulsifier is employed as the sole dispersant, introducing the resulting composition into an electrolytic cell and subjecting said monomeric compounds dispersed therein to an anodic oxidation to effect a polymerization thereof and deposition of the resulting polymer in the form of a film onto the anode surface of said electrolytic cell.

2. A process in accordance with claim 1, wherein the electrolyte solvent consists of from 90 to 100 percent by weight of water.

3. A process as claimed in claim 1, wherein the dispersant is used in an amount of from 0.001 to 1 mole per liter of electrolyte solvent.

4. A process as claimed in claim 1, wherein, in the electrolyte solvent, from 0.001 to 1 mole of a soluble conductive salt is used per liter of electrolyte solvent.

5. A process as claimed in claim 1, wherein the monomeric heteroaromatic compound is used in a concentration of from 0.001 to 5 moles per liter of electrolyte solvent.

6. A process as claimed in claim 1, wherein the electrochemical polymerization is carried out using a voltage of from 1 to 10 volt and a current density of from 0.05 to 50 $mA/cm^2$.

* * * * *

UNITED STATES PATENT AND TRADEMARK OFFICE
CERTIFICATE OF CORRECTION

PATENT NO. : 4,536,262

DATED : August 20, 1985

INVENTOR(S) : Gerhard WEGNER et al.

It is certified that error appears in the above-identified patent and that said Letters Patent is hereby corrected as shown below:

Please add:

--[30] Foreign Application Priority Data
    May 25, 1983 [DE] Fed.Rep.of Germany ..... 3318856--

Signed and Sealed this

Twelfth Day of November 1985

[SEAL]

Attest:

DONALD J. QUIGG

*Attesting Officer*    *Commissioner of Patents and Trademarks*